United States Patent [19]

Orndorff, Jr.

[11] Patent Number: 4,741,086

[45] Date of Patent: May 3, 1988

[54] PNEUMATIC LIFT JACK

[75] Inventor: Roy L. Orndorff, Jr., Kent, Ohio

[73] Assignee: The B. F. Goodrich Company, Akron, Ohio

[21] Appl. No.: 11,573

[22] Filed: Feb. 6, 1987

Related U.S. Application Data

[60] Division of Ser. No. 770,460, Aug. 29, 1985, which is a continuation-in-part of Ser. No. 714,766, Mar. 22, 1985, abandoned.

[51] Int. Cl.[4] .................... B23P 17/00

[52] U.S. Cl. .................... 29/423; 264/248; 264/316

[58] Field of Search .................... 29/423; 264/248, 236, 264/316, 221; 254/93 HP

[56] References Cited

U.S. PATENT DOCUMENTS

| | | | |
|---|---|---|---|
| 2,610,824 | 9/1952 | Grier | 254/93 HP |

FOREIGN PATENT DOCUMENTS

| | | | |
|---|---|---|---|
| 453143 | 9/1974 | Australia | 254/93 HP |
| 998972 | 1/1952 | France | 254/93 HP |
| 2125216 | 9/1972 | France | 254/93 HP |
| 2499462 | 8/1982 | France | 254/93 HP |
| 169023 | 10/1969 | United Kingdom | 254/93 HP |

*Primary Examiner*—Mark Rosenbaum
*Assistant Examiner*—Frances Chin
*Attorney, Agent, or Firm*—Joseph Januszkiewicz

[57] ABSTRACT

A pneumatic jack comprising flat sheets of an elastomeric material with no cords therein peripherally held in place by rigid framing members. The jack also includes a valve for communicating with the interior of the sheets. A source of aeroform fluid is utilized for inflating the jack to an enlarged shape to lift a car sufficiently for changing a tire.

9 Claims, 4 Drawing Sheets

FIG. 12
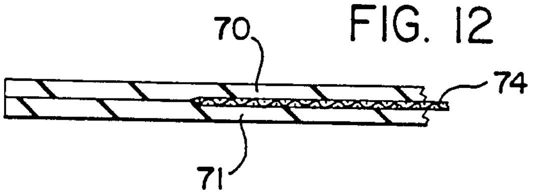
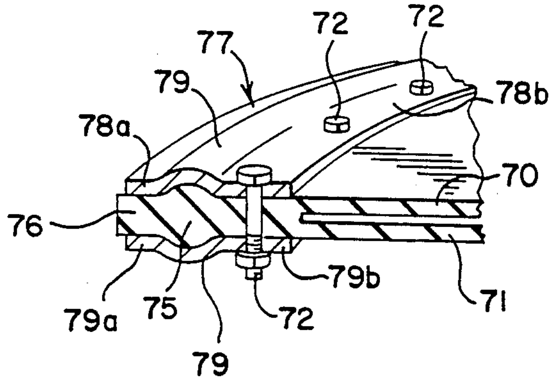
FIG. 13
FIG. 14
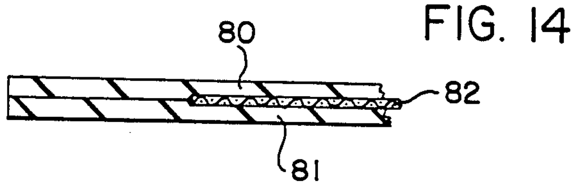
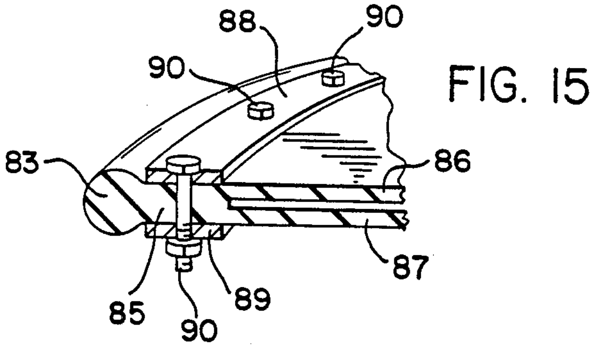
FIG. 15

PNEUMATIC LIFT JACK

This application is a division of patent application Ser. No. 06/770,460 filed Aug. 29, 1985 which is a continuation-in-part of patent application Ser. No. 06/714,766 filed Mar. 22, 1985 now abandoned.

BACKGROUND OF THE INVENTION

This invention relates to lifting devices such as jacks and particularly to fluid pressure or pneumatic type jacks having utility in lifting cars for changing flat tires, and to the method of making such jacks.

The difficulties, dangers and general inconveniences which are characteristic of mechanical lifting devices such as jacks are commonly known. Mechanical jacks are normally multi-component structures which are expensive and which require assembly prior to use. Further, mechanical aptitude is often required during their use.

Once in use, the stability of such jacks is often unsatisfactory. The user is required to take precautionary measures to guard against the car being lifted from, coming free of contact with, and support by, the jack. Furthermore, convenient and compact storage of these mechanical jacks is a problem as is their cost of manufacture.

Alleviation of certin of the aforementioned problems attendant with mechanical jacks has been made possible with fluid pressure or pneumatic type jacks.

One of the known forms of pneumatic jacks is the barrel-shaped structure or cylindrical bag stretcher which operates on the bellows type of principal. These pneumatic jacks offer advantages in that they are of an essentially one-piece construction, are easily and conveniently storec, and have good stability and are light weight when compared with most known mechanical jacks. One disadvantage of these jacks has been their high manufacturing cost, a factor believed to have precluded a wide market acceptance of such type of jack. A typical example of such jack is disclosed in U.S. Pat. No. 3,565,398. Another disadvantage in using such devices is that it requires careful positioning of the jack beneath the car to be lifted in order to preclude inadvertent rolling of such jack and movement of the car during, or subsequent to the full inflation of the jack.

Another type of fluid pressure or pneumatic type jack is described in U.S. Pat. No. 4,036,472 to Orndorff. This jack consists of a flat, rectangular, inflatable bag fabricated from two rectangular sheets stitched at their marginal portions. An inflation chamber is created between the sheets. Each of the two sheets includes layers of rubberized, mutually parallel, supporting cords extending at a pre-selected acute angle relative to the longitudinal center line of the sheets in which they are contained. Their cords are oriented with immediately adjacent layers being in opposite directions. Such type of jack, however, is still relatively expensive to fabricate.

Efforts all over the world have been and are being made to develop improved fluid pressure or pneumatic type jacks which would require a reduced manufacturing cost. Such developmental efforts, however, have heretofore been incapable of achieving sufficiently significant advantages of inflatable jacks over mechanical jacks to create their broad market acceptance.

The present invention overcomes these difficulties by a construction which makes the jack stable in use once inflated because of its unique anti-roll feature. A rigid peripheral rim wedges the pneumatic jack into a canted position which in effect prevents the further movement of the jack. The method of making the pneumatic jack results in low manufacturing costs when compared to prior similarly constructed jacks. In one form of the invention the peripheral rim has a non-metallic edge which enhances the anti-roll feature of the jack.

SUMMARY OF THE INVENTION

The present invention relates to the method of making a flat, inflatable, bag type jack comprised of upper and lower elastomer sheets. The sheets are joined together anc are supported peripherally by rigid framing members located on opposite sides of the sheets.

The sheets are preferably formed of an elastomeric material which is wear resistant in character and also resistant to tear or breakage, particularly when inflated. As a result of such characteristics, the inflated sheets will not be susceptible to an explosive failure when punctured. Rather, such sheets would leak air slowly when punctured to preclude harm to a user or car being lifted. Also, the invention contemplates rigid peripheral framing members which will provide added support to the sheets during inflation. The orientation of such rigid members which also includes an elastomeric ridge or edge bead that will, during and throughout inflation, provide an anti-rolling characteristic to the jack and car since the rigid framing members will effectively wedge between the ground and vehicle minimizing the amount of movement the vehicle will undergo when being lifted for further safety to the car and the user of the jack. Lastly, the jack is provided with a valve either directly on the lifting device or through a tube at a remote location whereby the valve may be conveniently coupled to a bellows, compressor or other suitable source of fluid to effect inflation during use.

The combination of features employed in the pneumatic jack of the present invention and the method of making such jack results in the objectives of providing a safe, low cost, effective jack which is convenient to store and simple to use.

These and other objects and further advantages and features will become apparent upon a reading of the following detailed description of the invention when read in conjunction with the appended claims.

BRIEF DESCRIPTION OF THE DRAWINGS

In the drawings which illustrate the invention in accordance with the presently preferred embodiment.

FIG. 12 is an enlarged fragmentary sectional view of a further modification of the pneumatic lift jack prior to vulcanization.

FIG. 13 is a perspective view of the rim construction of the pneumatic jack shown in FIG. 12 after vulcanization and with a peripheral rim clamp.

FIG. 14 is a still further modification of a lift jack in cross section prior to vulcanization similar to FIG. 12.

FIG. 15 is a perspective view of the rim construction of the pneumatic jack shown in FIG. 14 after vulcanization and with a rim clamp.

DESCRIPTION OF THE PREFERRED EMBODIMENT

Figure 1:
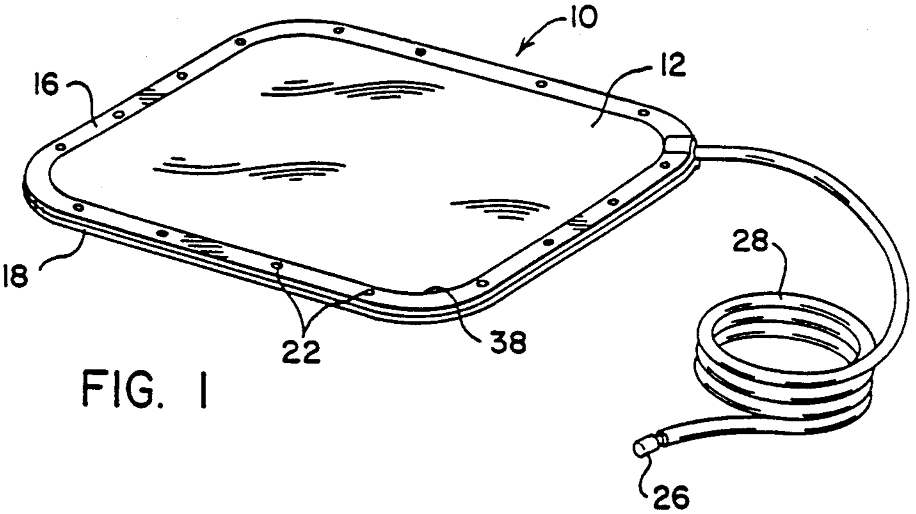
FIG. 1 is a perspective view of the pneumatic lift jack constructed in accordance with the present invention and shown in an uninflated condition.

The inflatable pneumatic jack 10 according to the preferred embodiment of the instant invention is shown in a deflated condition in FIG. 1. It is preferably formed of facing sheet members 12 and 14 in a rectangular, preferably square, shape. Surrounding the sheets on their periphery are rigid framing members 16 and 18 located on opposite sides of, above and below, the sheets. Rivets 22 are provided to extend through holes 24 in the framing members to hold the assembly in place. Bolts with nuts or other suitable coupling elements extending through holes in the sheets and framing members could be utilized as the equivalent of the rivets as shown.

The preferred material for the sheets is an elastomeric material such as a nitrile compound with a shore A hardness value of about 60. It has a stress-strain curve that is essentially straight from 0% strain to the ultimate or failure strain value of about 500%. This type of material eliminates the possibility of the "balloon effect" which is the sudden local enlargement of an inflatable all-elastomeric device due to a great increase in strain without a corresponding increase in wall stress. The balloon effect would lead to early product failure. The nitrile elastomer has good oil and heat resistance.

Nitrile elastomers are characterized by a high resistance to tear under pressure and high wear characteristics. Such materials when punctured would tend to leak air slowly rather than rapidly pop in an explosive manner which, during use, could cause a rapid falling of the vehicle being lifted, possibly resulting in harm to the car or to the user. Natural rubber compounds are particularly susceptible to the ballooning effect which can result in explosive blow-out or decompression.

Additional additives may preferably be added to insure adequate ozone and oxygen resistance in accordance with known chemical practices in a manner well known in the art.

Figure 6:
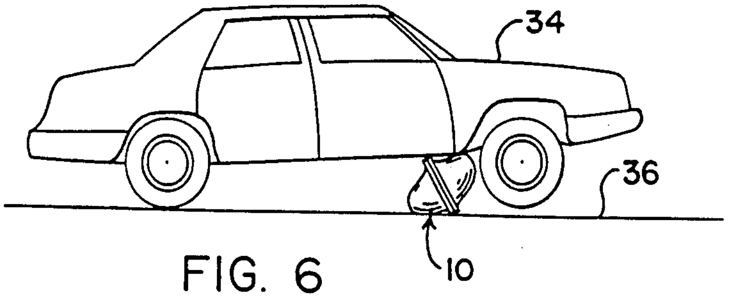
FIG. 6 is an illustration of a car raised by inflation of the pneumatic jack so as to permit the changing of a flat tire and illustrating the wedging action effected by the rigid framing members of the jack.

The two metal framing members shown for clamping the elastomeric sheets together serve several functions. They enable the elastomeric sheets to be made out of simple commercially available materials such as nitrile rubbers which can be riveted or bolted together to greatly simplify the manufacturing process as compared to a molded unit. The framing members restrain the elastomeric sheets to expansion in only one direction when the jack is inflated. They clamp in place the inlet valve or tube. They allow leakage if the unit if overpressurized. The exterior dimension of the framing members is greater than the intended lifting height so that they may act as wedges to prevent the rolling movement of the jack and car during operation by jamming or wedging underneath the car and above the ground when the jack tries to tilt as illustrated in FIG. 6.

In use, it is desirable to add an adhesive or sealer to the sheet material in the zone between the framing members. Such adhesive may assist in retaining the air tight relationship of the zone of inflation during inflation and use. Commonly known general purpose rubber adhesives may be utilized.

Figure 2:
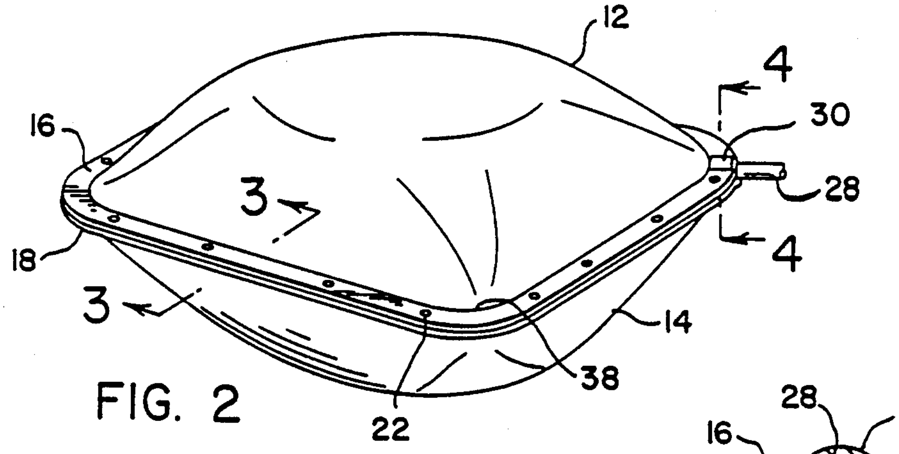
FIG. 2 is a perspective view of the inflatable lift jack shown in FIG. 1 but with the jack in the inflated condition.
Figure 4:
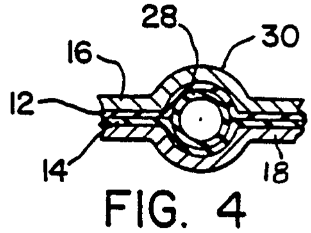
FIG. 4 is a sectional view similar to FIG. 3 but showing a corner of the jack where the inflation tube communicates with the interior inflatable chamber between the sheet members.
Figure 3:
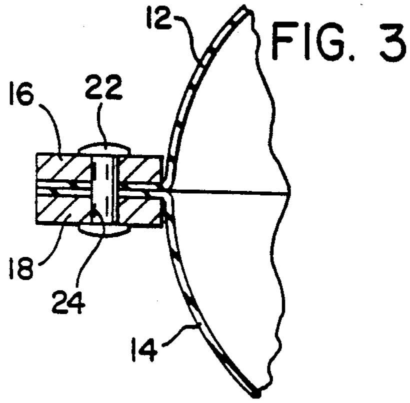
FIG. 3 is an enlarged sectional view of the device, taken through sectional lines 3—3 of FIG. 2 and illustrating the interconnection between the inflatable sheet members and the framing members.

Inflation is achieved through a standard tire valve 26 mounted in one end of an inflation tube 28. The other end of the inflation tube is in pneumatic communication with the interior of the sheets preferably through one corner of the framing member as shown in FIG. 2. The framing members must be formed with a tube receiving deformation 30 in the corner of the frame members as shown in FIG. 4 with the deformation shaped and sized to receive the end of the tube in a conforming manner.

Figure 5:
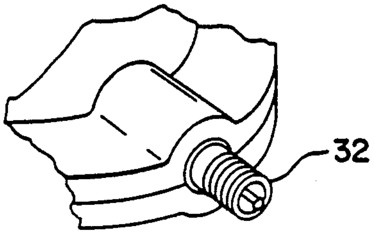
FIG. 5 is an enlarged perspective view similar to FIG. 4 but showing an alternate embodiment thereof with the valve directly communicating with the inflatable chamber between the sheets and with the inflation tube eliminated.

In the alternate embodiment of the inflating mechanisms as shown in FIG. 5, the inflation tube is eliminated and, rather, the standard tire valve 32 is mounted directly within the framing members at one corner for direct inflation of the jack through the source of compressed fluid. A tube coupled with, or separate from, the source of fluid is needed to achieve inflation.

In one initial successful model, square metal frames were made out of 0.125 inch thick aluminum with outside dimensions of 18 inches by 18 inches and inside dimensions of 16 inches by 16 inches. The nitrile elastomer sheets were each 0.125 inches thick. The whole assembly was bolted together. The overall weight of the jack was 6.1 lbs. Car clearance at a lift start was 9 inches. Final lift height with the inflated tire one inch off the ground was 12.75 inches. Inflation pressure was 12.5 psig, which decayed to 11.7 psig during the first several minutes with no drop in tire to ground clearance. Negligible further pressure decay took place. Calculated inflation volume was 2 cubic feet. The inflated tire wheel was off the ground for approximately 15 minutes before the jack was deflated, a time normally acceptable for changing of the tire. Measured sidewall elongation was 100% compared to the ultimate value of 515%. Deflated tensile set was 6%.

When the jack is inflated without load, the jack assumes an ovate shape rather than a spherical, enlarged shape. The shape was generally symmetric but the distance between the centers of the sheets was greater than the distance to the exterior edges of the frames of 18 inches. When lifting a car, the inflated device achieved a squashed shape to form a rough cube in order to achieve the required contract area.

Inflation devices required for utilization of pneumatic jacks are becoming commercially available in cars. Consequently, pneumatic jacks are also potentially more acceptable. Cars are being constructed with their own source of compressed aeroform fluid such as under the hood as part of the engine. Also, separate bottles can be provided in trunks as a limited supply of compressed air for the jack and tires. Further, pressure sources, operable off the electric power of a cigarette lighter are also known and in use today. All these related inflation devices make pneumatic jacks more commercially acceptable.

Materials for the rigid frame members would include steel, aluminum, cast aluminum, fiberglass reinforced plastic, or the like, so long as they had sufficient strength to resist the pressures applied thereto by the automobile and ground during use.

Testing of the new jack has revealed that stability or roll-off resistance is best when the jack is placed underneath the car with its diagonal dimension in line with the longitudinal axis of the car. The outside dimensions of 18 inches by 18 inches gives a diagonal distance of 25.5 inches. If a car starts to roll above the inflated jack, the diagonal, pointed outer corners of the framing material would dig in quickly to stop any movement of the car or jack.

FIG. 6 illustrates the jack wedged or jammed between a car 34 and the ground 36 to stop a roll of the jack and car. The transmission of the car was in neutral and the hand brake was off. The initial tire ground clearance of 1 inch had decreased to 0.5 inch when the roll was stopped. The inflated shape of the jack reduces the need for overly accurate placement of the jack under the car during its use.

Note is taken that framing members are provided with curves 38 at the corners of the rubber. Such curves tend to decrease the stress points of the rubber at these locations for insuring a smooth inflation of the sheets into an ovate or spherical type configuration during inflation and use, as illustrated in FIGS. 2 and 6.

Figure 7:
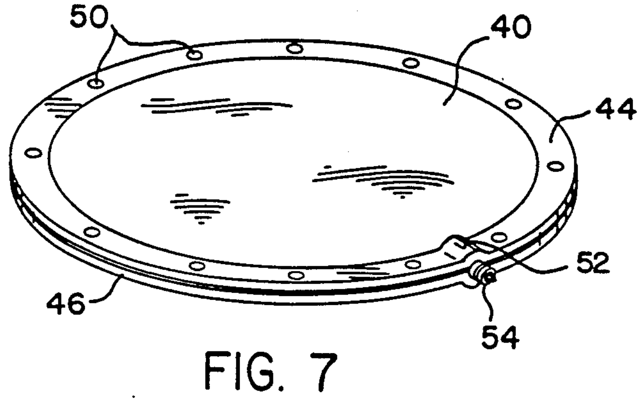
FIG. 7 is a perspective view of an alternate embodiment of the pneumatic lift jack constructed in accordance with the present invention shown in an uninflated condition.
Figure 8:
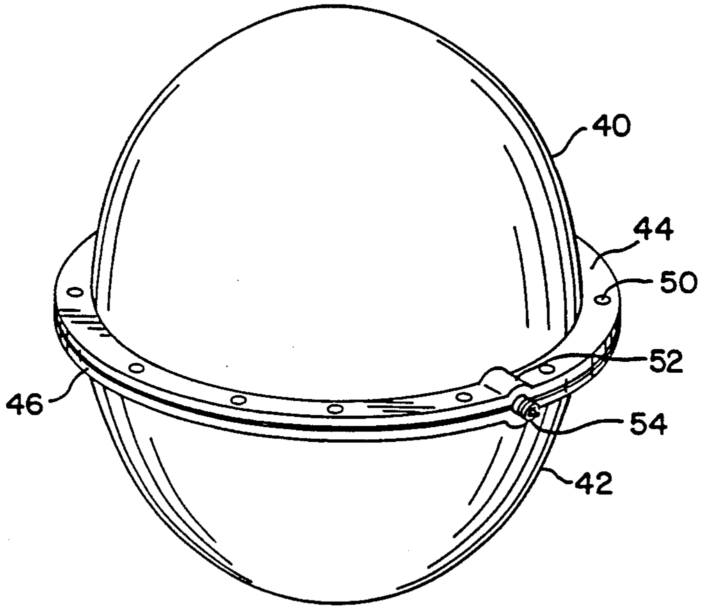
FIG. 8 is an illustration of the alternate embodiment as shown in FIG. 7 shown in an inflated condition for lifting a car so as to permit the changing of a tire.

In an alternate embodiment of the invention as shown in FIGS. 7 and 8, the sheeting material 40 and 42 is cut to a round configuration 18 inches in diameter. The metal frames 44 and 46 have inside diameters of 16 inches and outside diameters of 18 inches. Rivets 50 extend through holes in the frames and rubber plates as in the primary embodiment and a deformation 52 in the framing members permits the mounting of a valve 54, or, as in the primary embodiment, a tube with a remote valve. Suitable rubber cement is employed to enhance the seating of the sheets adjacent their peripheries. During free inflation the sheets assume an ovate shape as in the primary embodiment.

Figure 9:
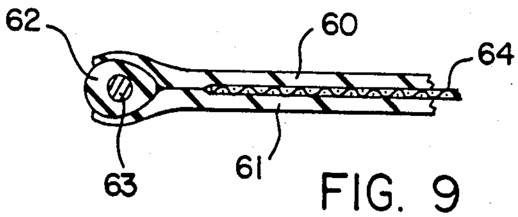
FIG. 9 is an enlarged fragmentary sectional view of a further modification of the pneumatic jack illustrating the interconnection between the upper and lower sheet members and the rim including the circumferential bead integral therewith prior to vulcanization.
Figure 10:
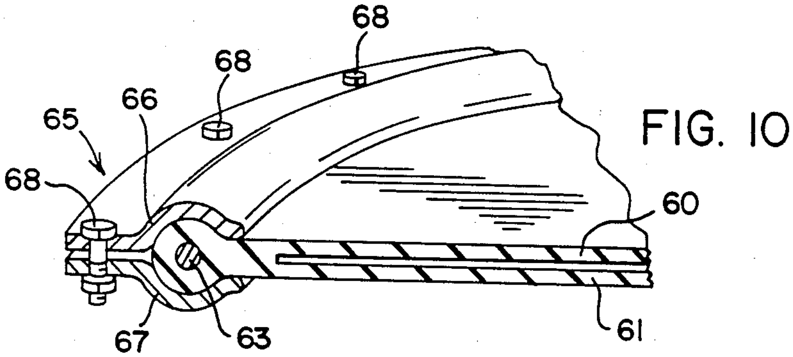
FIG. 10 is a perspective view of the rim construction of the pneumatic jack illustrated in FIG. 9 after vulcanization and with a rim clamp.
Figure 11:
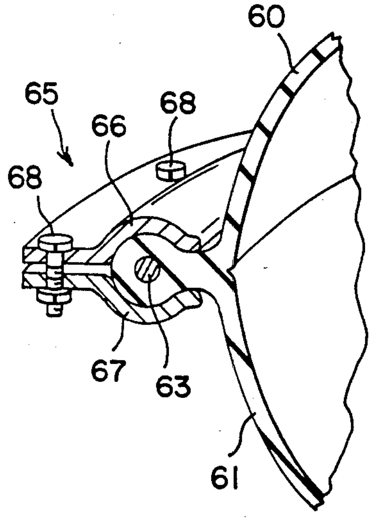
FIG. 11 is a fragmentary perspective view of the inflatable lift jack shown in FIG. 10 in the inflated condition.

A further modification of the invention is shown in FIGS. 9, 10, and 11 wherein during the preparation of the inflatable jack two elastomeric sheeting materials 60 and 61 are cut into a round configuration similar to the embodiment of FIG. 7 (although the configuration of FIG. 1 is also contemplated) with the respective peripheral edges overlying an annular bead of rubber 62 that encircles a metallic bead 63. A suitable layer of paper or a plastic film 64 is laid between the two sheeting materials 60 and 61 such that the film 64 extends to within a short distance of the annular bead 62. Upon vulcanization of the inflatable jack, a mold is employed that retains the enlarged shape of the annular bead 62 compared to the flat sheeting of elastomeric materials 60 and 61 to provide a one-piece pneumatic jack structure as illustrated partially in cross section in FIG. 10. Such layer of paper or plastic film 64 is herein defined as a separator and causes the elastomer layers 60 and 61 to be non-adhered since the paper layer or plastic film 64 disintegrates during vulcanization into a thin film of ash or powder that prevents adherence to adjacent opposite faces of the sheet materials 60 and 61 during such high heat of vulcanization. The paper is so dissimilar to the rubber on elastomeric sheeting material that in absence of an adhesive there is no adhesion between them. A circular C-shaped clamp 65 is used to provide reinforcement for the peripheral edge of the jack. Such clamp 65 has two circular half-sections 66 and 67 with a plurality of circumferentially spaced aligned bores therein that receive bolts 68 to assist in the reinforcement. Such clamp also assists in the wedging action of the pneumatic jack in its use under a vehicle as illustrated in FIG. 6. With such one-piece structure, the inflatable jack eliminates some possible leakage problems in the two-piece sheet constructed inflatable jacks, FIG. 1. In addition to the use of paper or plastic film to effect and maintain a separate cure of the respective layers 60 and 61, silver paint may be used. With both oppositely disposed surfaces of the elastomeric sheeting material painted, the elastomeric sheet cures during vulcanization with the paint sticking to it, therefore both oppositely disposed surfaces do not stick to each other during vulcanization.

Another modification similar to the invention shown and described as to FIGS. 9 through 11 is that shown in FIGS. 12 and 13 wherein two elastomeric sheeting materials 70 and 71 are cut into round configurations separated by a suitable layer of paper or a plastic film 74. Such layer of paper 74 is placed between layers 70 and 71 except that such paper terminates adjacent to the peripheral edges of the layer to permit the merging of the two layers at such edges during vulcanization leaving a non-adhered void where the layer of paper was disposed and disintegrates into a film of ash during vulcanization. The two layers of sheeting 70 and 71 along with the layer of paper 74 are then placed in a mold for vulcanization. After vulcanization the two layers of elastomeric sheeting material form a unitary inflatable jack having a flared or bulged edge 75 adjacent to the outer periphery with a planar circumferential portion 76 along the entire periphery thereof. A circular clamp 77 is used to provide a rigid reinforcing edge for the pneumatic jack. Such clamp 77 is composed of two circular half sections 78 and 79, both being off-set along its mid portion to accommodate the flared or bulged edge 75. Each half section 78 and 79 has a plurality of circumferentially spaced aligned bores therein that receive bolts 72. The curved section of each half section 78 and 79 defines an outboard portion (78*a* and 79*a*) that lies along the peripheral edge and an inboard portion (78*b* and 79*b*) that lies inwardly towards the inflatable portion of the jack. Inboard portions 78*b* and 79*b* are the portions that receives the bolts 72 and are protected from damage from external sources because of being inwardly of the bulge 75.

A further modification is shown in FIGS. 14 and 15 wherein two elastomeric layers of sheeting material 80 and 81 are cut into round configuration and placed over each other but separated for the most part by a thin layer of paper or a plastic film 82 which is laid between them. As seen in FIG. 14, the annular layer of paper or plastic film approaches the peripheral edges but sufficient room is left such that on placing such layers in a mold for shaping and vulcanization a flared or bulge 83 is formed along the entire periphery of the jack with two layers 80 and 81 forming a planar circular portion 85 adjacent such bulge with the two layers 80 and 81 forming two-spaced planar portions 86 and 87 created by the separator or the paper layer during vulcanization. The planar portion 85 receives a pair of vertically spaced circular rims 88 and 89 which rim portions have a plurality of circumferentially spaced aligned apertures which receive bolts 90 to firmly clamp the planar portion 85 and provide rigidity to the pneumatic jack that facilitates the wedging action when inflated and used to jack up a vehicle for the changing of a tire. In all of the examples described above, a suitable valve means such as that described in FIGS. 1 or 5 is provided to assure means to inflate and deflate such jack.

It is clear that further modifications can be made to the presently disclosed embodiment described herein without departing from the spirit and scope of the invention as measured by the appended claims.

I claim:

1. A method of making a pneumatic jack comprising the steps of encompassing a thin separator by a pair of elastomeric sheets to form a flat sheet in a mold, heating said flat sheet in said mold to vulcanize said flat sheet into a flat sheet with a flared peripheral edge while disintegrating said separator during such heating process to form a chamber coextensive with the position held by said separator wherein said separator prevents adherence between opposed surfaces of said pair of elastomeric sheets, providing a valve means in said pneumatic jack that communicates with said chamber formed by said disintegrated separator to allow pressurizing said chamber, and attaching a rim clamp to the periphery of said vulcanized sheet to provide a reinforcing edge to said formed pneumatic jack.

2. A method of making a pneumatic jack as set forth in claim 1 wherein said rim clamp is located adjacent to said flared peripheral edge and radially inwardly thereof on said flared peripheral edge.

3. A method of making a pneumatic jack as set forth in claim 2 wherein said separator is a thin sheet of paper facilitating the disintegration of the paper during the vulcanization of said flat sheet.

4. A method of making a pneumatic jack as set forth in claim 1 wherein said vulcanizing of said flat sheets forms said sheet into a circular form and molds a flat solid annular planar surface radially outwardly of said flared peripheral edge of said pneumatic jack.

5. A method of making a pneumatic jack as set forth in claim 4 wherein said rim clamp is located on said radially outwardly disposed flat annular surface.

6. A method of making a pneumatic jack as set forth to claim 4 wherein said rim clamp is located radially inwardly of said flared peripheral edge of said jack.

7. A method of making a pneumatic jack comprising the steps of laying a bead on the peripheral edge of a first sheet of an elastomer, locating a thin separator layer on said sheet of said elastomer and having the peripheral edge of said separator spaced radially inwardly from said bead, placing a second sheet of an elastomer onto said first sheet of elastomer and said separator layer to form a composite and with said bead forming a bulge and a peripheral edge, connecting a valve to said sheets of elastomer to communicate with said separator, heating said composite to vulcanize said composite with said pair of elastomeric sheets adhered integrally to each other along their peripheral edge with said separator preventing adherence of oppositely disposed adjacent portions of said sheets of elastomers to each other that were separated by said separator layer as said separator layer disintegrates into a thin film of powder, and placing a clamp onto said peripheral edge of said bead of said vulcanized composite to firmly engage said peripherally extending elastomeric covered bead.

8. A method of making a pneumatic jack as set forth in claim 7 wherein said thin separator layer on said sheet of said elastomer is a thin coat of paint to prevent adhesion during vulcanization.

9. A method of making a pneumatic jack as set forth in claim 7 wherein said thin separator is a thin sheet of paper that facilitates disintegration thereof.

* * * * *